Oct. 27, 1953     J. P. QUARLES     2,657,091
SPRAY APPARATUS FOR RAILROAD RIGHTS OF WAY
Filed Oct. 27, 1951                              3 Sheets-Sheet 1

INVENTOR.
JOHN P. QUARLES
BY
Jennings & Carter
ATTORNEYS

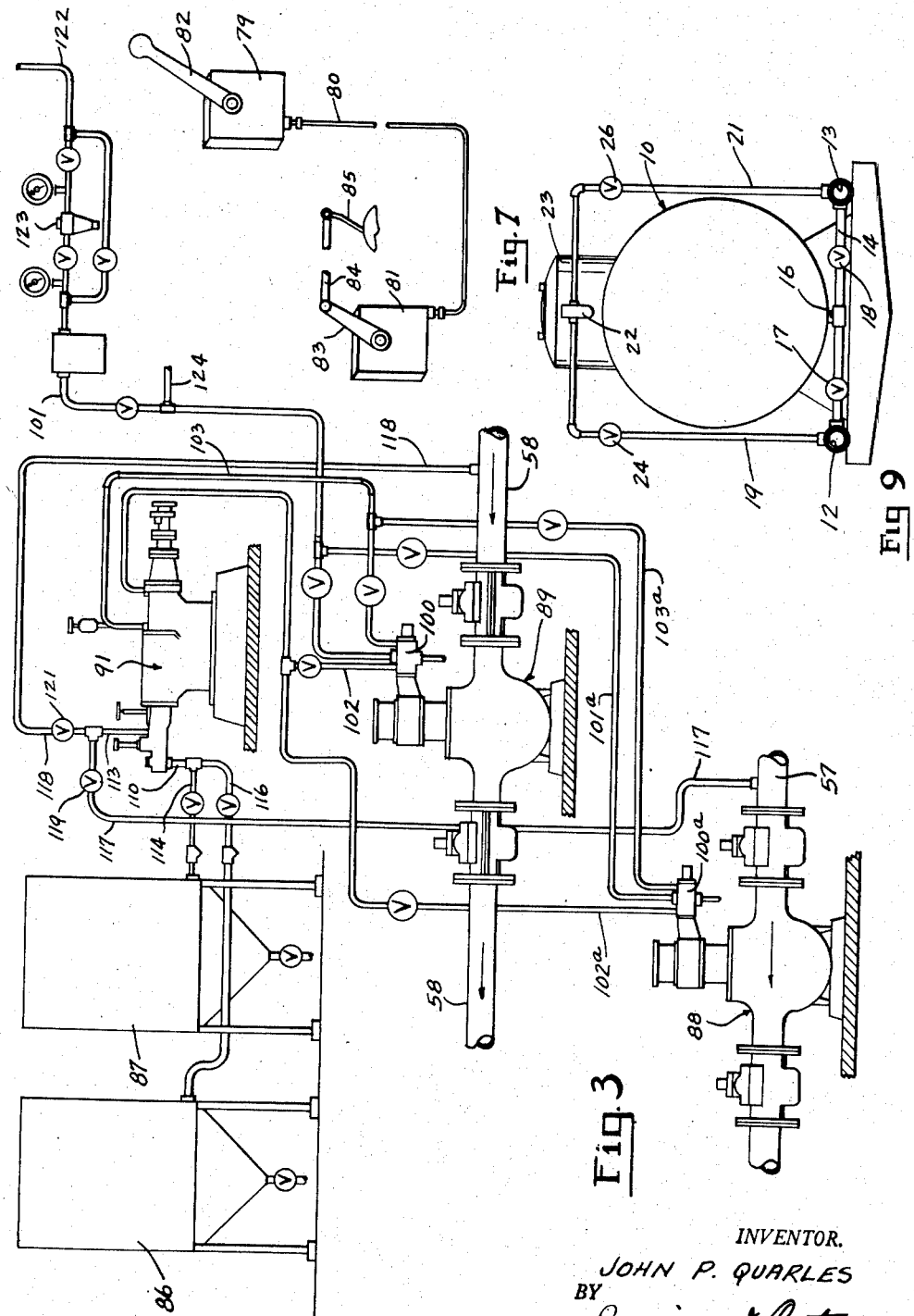

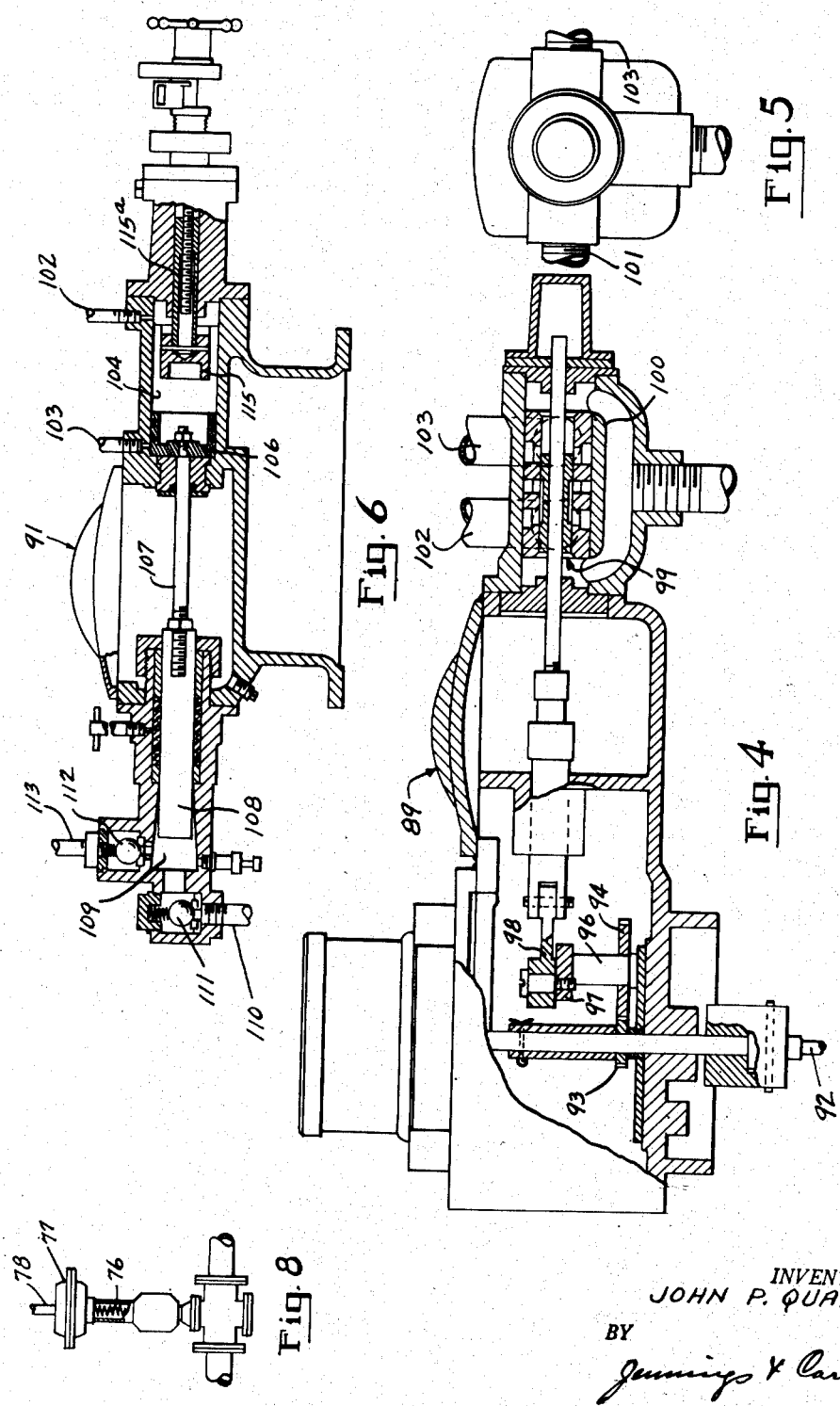

Patented Oct. 27, 1953

2,657,091

UNITED STATES PATENT OFFICE 2,657,091

SPRAY APPARATUS FOR RAILROAD RIGHTS OF WAY

John P. Quarles, Huntington, W. Va.

Application October 27, 1951, Serial No. 253,501

11 Claims. (Cl. 299—31)

This invention relates to spray apparatus and particularly to apparatus for spraying railroad rights of ways and road beds for the control of vegetation. It embodies some of the features described but not claimed in my copending application, Serial No. 137,720, filed January 10, 1950, together with important improvements thereon.

In the control of vegetation along railroad rights of ways and railroad road beds, so called weed killing chemicals have gone into wide use. As is well known, such chemicals may be obtained in concentrated form and mixed with water or some other liquid medium to form the spray solution or mixture. The weed killing chemical forms a very small percentage, often 1% or less, of the solution or mixture. It has heretofore been the practice to make the mixture at some central location and ship it to the area of use. Inasmuch as by far the greater proportion of such mixtures consists of water, the practice heretofore employed entailed long hauls of a large amount of water. It is one of the purposes of my present invention to provide apparatus for making the mixture in the proper proportions as it is being sprayed thereby making it possible to obtain the necessary water at a point near that where the mixture is being used.

A further object of my invention is to provide spray apparatus in which already mixed chemicals may be continuously remixed and recirculated while spraying is going on and thus prevent settling out of the ingredients of the mixture.

A still further object of my invention is to provide spray apparatus embodying a pressure creating pump for supplying the spray guns, together with suitable conduits and valves whereby a part of the liquid under pressure created by the pump is returned to the supply, thereby effecting a recirculation and remixing of the chemicals.

The foregoing and other objects are obtained by means of my invention, features of which are illustrated in the accompanying drawings, forming a part of this application in which:

Fig. 3 is a diagrammatic view illustrating the means for supplying concentrated chemicals to the spray solution as it is being sprayed;

Fig. 4 is a sectional view showing a meter actuated pilot valve for controlling the proportional pump employed with my invention;

Fig. 5 is an end view of Fig. 4;

Fig. 6 is a sectional view of the proportional pump;

Fig. 7 is a view showing a remote control device for controlling the motors for driving the pumps;

Fig. 8 is a sectional view of one form of remotely controlled valve employed with my invention; and, Fig. 9 is a partially sectional end view of a tank car employed with my invention.

Figure 1:
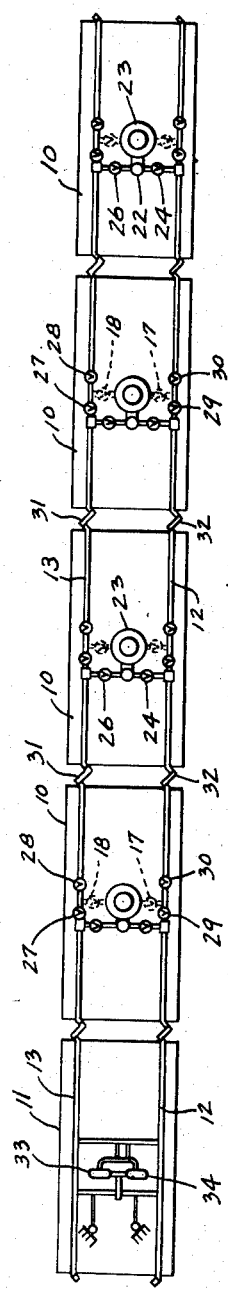
Fig. 1 is a diagrammatic plan view of a train equipped with my invention.

Referring now to the drawings for a better understanding of my invention, I show in Fig. 1 a supply and spray train which includes a plurality of tank cars 10, here shown as four in number, and a spray car 11. Each of the tank cars 10 is provided with relatively large diameter dual conduits or pipes 12 and 13, located on opposite sides and extending the length of the car, which communicate through a pipe 14 with an outlet 16 in the bottom of the tank. Valves 17 and 18 provide means whereby liquid may be withdrawn through either of the conduits 12 or 13 from the tank 10. See Fig. 9. Connected to the pipes 12 and 13, respectively, are vertically extending pipes 19 and 21 which connect at their upper ends to an inlet connection 22 which empties into the upper neck portion 23 of the tank. Valves 24 and 26, in the pipes 19 and 21, provide means whereby communication through said pipes may be established or closed off. The conduits 12 and 13 are provided respectively, with valves 27 and 28 and 29 and 30 located on opposite sides of the cross pipe 14. By the system of valves and conduits just described, it will be seen that communication may be had with any one of the tank cars 10 through either side of the car and through the top or the bottom thereof.

The conduits 12 and 13, preferably are relatively large diameter pipes, being in actual practice, four inches in diameter, and are connected to adjacent tank cars and to the spray car 11 by means of flexible couplings 31 and 32 which may be coupled and uncoupled in a manner well understood. The conduits 12 and 13 extend also along the sides of the spray car 11.

Mounted on the spray car 11 are two centrifugal pumps 33 and 34 driven, respectively, by internal combustion engines 36 and 37. The inlet sides of the pumps 33 and 34 are connected by means of a common conduit 38 and the outlet sides are connected to a common conduit 39 (see Fig. 2) having check valves 39a and 39b therein.

Liquid for supplying the inlet sides of the pumps may be drawn selectively from either of the large pipes 12 or 13 through cross pipes 41 or 42, connected, respectively, to the pipes 12 and 13. Valves 43 and 44 in the conduit 12 and valves 46 and 47 in the conduit 13 provide means whereby liquid may be drawn selectively from either conduit. It will be understood that the car 11 may be turned around and have its conduits 12 and 13 at either end coupled to a tank car. Liquid withdrawn from either of the conduits 12 or 13, as the case may be, passes into a U-shaped pipe 48 which has its two legs 49 and 51 connected to the supply conduit 38 for the pumps 33 and 34. On its way to the pump, the liquid passes through suitable strainers 52 or 53, each of which is supplied with cut-out valves 52a, 52b and 53a and 53b. The cross supply conduit 38 is provided with valves 54 and 56 whereby the liquid entering the pipe 38 may be directed selectively to either of the pumps 33 or 34.

The cross pipe 39 to which the outlets of the pumps 33 and 34 are connected, in turn have connected thereto two discharge pipes 57 and 58, controlled respectively by valves 59 and 61. The pipe 57 leads, through suitable connections, to spray guns 62, 63, 64 and 66 such as are described in my co-pending application Serial No. 137,720, filed January 10, 1950. The pipe 58 leads, to cross pipes 67 and 68 to which suitable sprays, not shown, may be connected, such as for spraying the road bed and sidings. When the sprays supplied by the cross pipes 67 and 68 are to be used, the car 11 is turned around so that that end of the car is at the rear of the train. Suitable valves, as shown, are provided in the cross pipes 67 and 68 for controlling the supply of liquid therethrough.

The capacities of the pumps 33 and 34 are such as to supply more fluid than is required by the sprays being used. As is well known, also, many of the materials used for spraying railroad rights of way is in the form of an emulsion or suspension which necessarily has to be maintained in agitation in order for the ingredients not to separate. In order to accomplish this, I provide a short connecting pipe 69 between the common outlet pipe 39 from the pump and a cross pipe 71 which is connected at its end to the pipes 12 and 13 of the spray car. A valve 72 is provided in the connecting pipe 69. The cross pipe 71 has provided near its ends two remotely controlled valves 73 and 74, one of which is shown in detail in Fig. 8. These valves are of well known construction and form no part of my present invention. Each of them is closed by means of a spring 76 and is opened by air pressure admitted into a diaphragm housing 77 through a pipe 78. When it is desired to recirculate a part of the liquid, one of the valves 73, or 74, as the case may be, is closed and the other opened, and the valve 72 is opened. Fluid from the common outlet pipe 39 then passes through the pipe connection 69, the pipe 71, the valve 73 or 74, as the case may be, thence through its associated pipe 12 or 13, to the car from which the mixture is being withdrawn. The valve, 17 or 18, as required, is closed and the other opened. The liquid then passes upwardly through the pipe 19 or 21, as the case may be, into the inlet 22 in the top of the tank. Thus while the liquid is being withdrawn from the outlet 16 in the bottom of the tank, a part is being returned through the inlet 22. This, added to the motion of the train in which the mixture is being hauled provides a thorough mixing as well as a recirculation of the liquid.

In order to vary the speed of the centrifugal pumps 33 and 34, and consequently the amount and pressure of liquid under pressure which they will produce, I provide means for varying the supply of fuel to the internal combustion engines 36 and 37 which drive the pumps. In Fig. 7 of the drawing, I show a well known form of hydraulic transmitter 79 which is connected by means of a pipe 80 to a hydraulic receiver 81. When the handle 82 of the transmitter 79 is moved from the position shown in the drawing, a corresponding arm 83 on the receiver 81 is similarly moved. The arm 83 is connected by means of a link 84 to the throttle lever 85 of the engine. It will be understood that the transmitters 79, two in number to serve the two engines, will be located at a point convenient to the reach of the person operating the spray guns.

As is well understood, it is desirable to add concentrated vegetation controlling chemicals, at times, to the sprays as it is being delivered. Accordingly, I provide, on the spray car 11, two tanks 86 and 87 for containing such concentrated chemicals. The manner in which these are added to the mixture will now be described. Located in the discharge line 57 is a flow meter 88 and located in the discharge line 58 is a flow meter 89. Also, I may employ a mixing chamber 90 of suitable design in one or both of the fluid discharge pipes, such as shown in the discharge pipe 58 to insure thorough mixing of the chemicals before they reach the sprays. These flow meters are of well known construction and are not claimed per se as a part of my invention, but are a component part of the improved combination which I have devised. To avoid confusion only one of the flow meters is shown and described in detail. The flow meters 88 and 89 each may selectively control proportional pumps 91, or 95, as required, to supply concentrated chemicals to the discharge lines 57 or 58, in a manner presently to be described. Each pump may withdraw liquid from one or the other of the tanks 86 and 87 and discharge it into the selected fluid discharge line leading from the pumps 33 and 34.

Each of the meters 88 and 89 embodies a rotating element 92 which, as is well understood, rotates responsive to the flow of fluid through the pipe in which the meter is located. The rotating element 92 has mounted thereon a pinion 93 which meshes with a gear 94, mounted on a shaft 96, carrying a crank 97, which actuates a connecting link 98. The link 98 is coupled to a pilot valve 99 which is operable in a valve chamber 100 to which air under pressure is supplied, from a suitable source, through a pipe 101. Reciprocation of the pilot valve 99 admits air under pressure, and exhausts it alternately, through pipes 102 and 103 to opposite ends of a cylinder 104 of the proportional pump 91 which has a piston 106 located therein. The piston 106 has a piston rod 107 which is connected to a plunger 108.

Concentrated chemicals from either the tank 86 or 87 is admitted to the outer end of the chamber 109 in which the plunger 108 is located through a conduit 110 and a suction valve 111. This liquid is discharged through a discharge valve 112 and a discharge conduit 113. The conduit 110 for admitting liquid to the outer end of the chamber 109 is connected to conduits 114 and 116 leading respectively from the tanks 87 and 86. These conduits are provided with suitable valves, as shown, whereby either of the tanks may be connected to the pump. The stroke of the piston 106 may be varied by means of a dash pot 115 mounted in the outer end of the cylinder 104, the position of which may be varied by means of an adjusting screw 115a. The dash pot 115 is adapted to engage and fit in the adjacent end of the piston 106 as it moves to the right, as viewed in Fig. 6, and thus cushions its movement in that direction. By this arrangement, it will be seen that the volume of concentrated liquid pumped at each stroke may be varied.

The discharge conduit 113 has connected thereto branch conduits 117 and 118 which lead, respectively, to the discharge pipes 57 and 58 leading to the spray guns. Valves 119 and 121 provide means whereby the concentrated liquid may be routed to either of the discharge pipes. Inasmuch as the piston 106, by the means shown, reciprocates responsive to the flow of liquid through the meter 89, it will be seen that concentrated chemicals in the desired proportions may be added to the liquid as it is being sprayed.

Preferably, the air under pressure supplied to the pilot valve 99, as heretofore described, is obtained from the air pressure line (not shown) on the railroad train. A conduit 122 leads from the air pressure line, and has located therein a pressure reducing valve 123 which reduces the pressure to the desired amount for operating the proportional pump 91. The conduit 101 heretofore described conveys this reduced pressure to the pilot valve. A branch conduit 124 connects with the pipe 78 and the latter is provided with two valves 125 and 126 which as is understood will be located within easy reach of the operator of the spray guns to control the valves 73 and 74.

Figure 2:
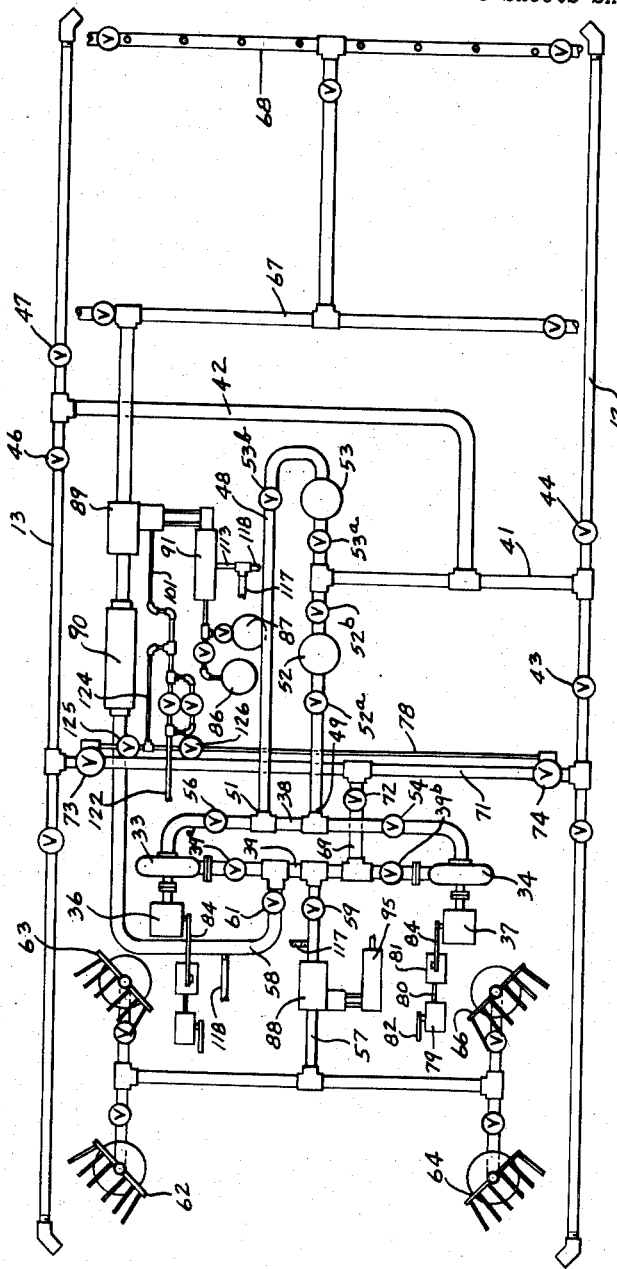
Fig. 2 is a diagrammatic view showing the piping diagram and arrangement of apparatus on the car carrying the pumps, concentrated chemicals and spray guns.

As shown in Figs. 2 and 3 it will be seen that the pump 91 may be made to discharge concentrated chemicals into either the discharge line 57 or the discharge line 58 by manipulation of the proper valves. It will also be seen that the proportional pumps 91 or 95, as the case may be must operate responsive to the action of the meter 88 or 89, as the case may be, through which the spray fluid is being discharged. In order to provide for such selective control I connect the air supply pipe 101 through a branch pipe 101a to the pilot valve chamber 100a of the meter 88 and connect branch pipes 102a and 103a from the pivot valve chamber to the pipes 102 and 103 leading to the proportional pump. Suitable valves, as shown, provide means whereby the air for operating the pump 91 may be routed through either meter.

It will be understood also that the proportional pumps 91 and 95 may be operated singly or jointly responsive to the flow of fluid through either of the meters 88 or 89, depending upon which sets of sprays are being used. Such arrangement is a duplication of that shown in Fig. 3 and accordingly is not shown or described in detail.

From the foregoing description, the operation of my improved apparatus will be readily understood. The tank cars 10 will be filled with water or with a suitable solution or emulsion for the control of vegetation, as desired, and the said tank cars may be selectively coupled through the conduits 12 and 13 and the valves shown, to the apparatus located on the spray car 11. There, the conduits 12 or 13 may be selectively connected to the inlets of the pumps 33 and 34, either of which, or both, may be operated to supply the spray guns. Assuming that the spray guns 62, 63, 64 and 66 are being operated, the liquid under pressure is discharged through the pipe 57, the valve 59 being open. The pumps 33 and 34 have a capacity greater than that required for supplying the spray guns and it may be desired to so operate them as to supply more than is required by the spray guns. In such event, one of the valves 73 or 74 is closed and the other opened allowing the excess of liquid to be discharged back through the pipe 12 or 13, as the case may be. This liquid is then discharged finally through the upstanding pipe 19 or 21, as the case may be, and through the opening at the inlet connection 22 in the top of the tank car. By this means, as liquid is being withdrawn from the bottom of the tank car, a part is being returned through the inlet section 22 into the top thereby maintaining liquid in the tank car in suspension or emulsion and properly mixed. The motion of the train on which the operation is being carried out aids in maintaining the liquids properly mixed.

Assuming that it is desired to add concentrated chemicals to the liquid being sprayed, air under pressure is admitted through the pipe 101 to the pilot valve 99 and the proportional pump 91 has its plunger chamber 109 connected to one of the tanks 86 or 87, as the case may be, through the pipe 110. The required amount of liquid to be pumped being regulated by the position of the dash pot 115, the concentrated chemical is added to the solution being sprayed being admitted through the pipe connection 117, ahead of the meter 88.

It will thus be seen that I have provided an extremely flexible apparatus for supplying vegetation controlling chemicals to spray apparatus on a railroad train in the proper proportions, and with the concentrated chemicals being added to the solution as it is being sprayed. It will also be seen that with my improved apparatus, emulsions and suspensions of chemicals carried in the spray apparatus may be maintained thoroughly mixed at all times.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In railway spray apparatus, a plurality of tank cars, a car on which spray guns are mounted, dual conduit means connecting all the cars, one of said conduit means being connected to one part of each of said tank cars and the other to another part thereof, pump means on the car on which the spray guns are mounted for withdrawing liquid selectively from said tank cars through a selected one of said conduit means and delivering it under pressure to the spray guns, said pump means having a capacity greater than that required for said spray guns, means disposed between the pump means and the spray guns to inject concentrated chemicals into the liquid, and means to deliver the excess liquid delivered by said pump means into the other of said conduit means to recirculate it in said selected tank cars.

2. In railway spray apparatus, a plurality of tank cars, a car on which spray guns are mounted, dual conduit means connecting all the cars, one of said conduit means being connected to one part of each of said tank cars and the other to another part thereof, pump means on the car on which the spray guns are mounted for withdrawing liquid selectively from said tank cars through one of said conduit means and delivering it under pressure to the spray guns, said pump means having a capacity greater than that required for said spray guns, means to deliver the excess liquid delivered by said pump means into the other of said conduit means to recirculate it in said selected tank cars, and means disposed between the pump means and the spray guns to inject chemicals into the liquid delivered to the spray guns in proportion to the said liquid discharged by said spray guns.

3. In railway spray apparatus, a car upon which spray guns are mounted and having a container for concentrated chemicals mounted thereon, conduit means leading to the spray guns, at least one tank car operatively coupled to the first mentioned car and containing unconcentrated liquid to be sprayed, conduit means connecting the tank car to the car upon which the spray guns are mounted, pump means mounted on the last mentioned car and disposed to withdraw unconcentrated liquid through said last mentioned conduit means and deliver it to the conduit means leading to the spray guns, a meter in the conduit means leading to the spray guns, and a proportional pump disposed between the pump means and the spray guns and operative responsive to the operation of the meter to inject concentrated chemicals into said liquid and operative to vary the ratio of chemicals to unconcentrated liquid.

4. In railway spray apparatus, a car upon which spray guns are mounted and having a container for concentrated chemicals mounted thereon, conduit means leading to the spray guns, at least one tank car operatively coupled to the first mentioned car and containing unconcentrated liquid to be sprayed, conduit means connecting the tank car to the car upon which the spray guns are mounted, pump means mounted on the last mentioned car and disposed to withdraw unconcentrated liquid through said last mentioned conduit means and deliver it to the conduit means leading to the spray guns, a meter in the conduit means leading to the spray guns, a proportional pump disposed between the pump means and the spray guns and operative responsive to the operation of the meters to inject concentrated chemicals into said liquid, and means to vary the ratio of concentrated chemicals to unconcentrated liquid delivered to the spray guns.

5. Apparatus as defined in claim 2 in which the means disposed between the pump means and the spray guns to inject chemicals into the liquid comprises a reservoir for chemicals, a proportional pump, power means for driving the proportional pump and a flow meter to control the said power means.

6. In a spray apparatus adapted to be mounted on railway cars, a spray car, a plurality of tank cars operatively coupled to the spray car, at least one of said tank cars containing unconcentrated liquid, a supply of concentrated chemical on the spray car, dual conduit means connecting all cars, pump and pipe means mounted on the spray car and disposed to withdraw liquid selectively from any of the tank cars, and means for recirculating, injecting concentrated chemicals and adding chemicals thereto, and delivering said liquid to the spray guns.

7. Apparatus as defined in claim 6 in which the means to inject concentrated chemicals into the liquid are constructed and arranged to inject said chemicals into said liquid in proportion to the liquid flowing to the spray guns.

8. In railway spray apparatus, a plurality of tank cars, a car on which spray guns are mounted, all of said cars being operatively connected, conduit means connecting all the cars, constructed and arranged to connect the tank cars selectively to the car on which the spray guns are mounted, pump means on the car on which the spray guns are mounted constructed and arranged to withdraw liquid selectively from said tank cars through said conduit means and deliver it through another conduit to said spray guns, a supply of chemicals, and a proportional pump disposed between the pump means and the spray guns and adapted to deliver chemicals into the liquid leading to the spray guns in proportion to the flow of liquid thereto.

9. In railway spray apparatus, a plurality of tank cars, a car on which spray guns are mounted, all of said cars being operatively connected, conduit means connecting all the cars constructed and arranged to connect the tank cars selectively to the car on which the spray guns are mounted, pump means on the car on which the spray guns are mounted constructed and arranged to withdraw liquid selectively from said tank cars through said conduit means and deliver it through another conduit to said spray guns, a supply of chemicals, a proportional pump disposed between the pump means and the spray guns and adapted to deliver chemicals into the liquid leading to the spray guns in proportion to the flow of liquid thereto, and means included in the proportional pump to vary the ratio of chemicals to liquid.

10. In railway spray apparatus, a plurality of tank cars, a car on which spray guns are mounted, all of said cars being operatively connected, conduit means connecting all the cars constructed and arranged to connect the tank cars selectively to the car on which the spray guns are mounted, pump means on the car on which the spray guns are mounted constructed and arranged to withdraw liquid selectively from said tank cars through said conduit means and deliver it through another conduit to said spray guns, a supply of chemicals, a proportional pump disposed between the pump means and the spray guns and adapted to deliver chemicals into the liquid leading to the spray guns in proportion to the flow of liquid thereto, means included in the proportional pump to vary the ratio of chemicals to liquid, fluid power means for operating the proportional pump, and a flow meter in the conduit leading to the spray guns including means to control the supply of operating fluid to the proportional pump.

11. In railway spray apparatus, a train of cars including a spray car with spray nozzles mounted thereon and a plurality of tank cars operatively connected to the spray car, at least one of said tank cars containing unconcentrated liquid, dual conduit means connecting all cars, pump and pipe means mounted on the spray car and disposed to withdraw liquid selectively from any of the tank cars and deliver it to the spray nozzles, and means for injecting concentrated chemicals into the pipe means on the spray car for delivery to the nozzles.

JOHN P. QUARLES.

References Cited in the file of this patent

UNITED STATES PATENTS

| Number | Name | Date |
|---|---|---|
| 1,205,070 | Wilson et al. | Nov. 14, 1916 |
| 2,590,007 | Griswold | Mar. 18, 1952 |

FOREIGN PATENTS

| Number | Country | Date |
|---|---|---|
| 348,294 | Great Britain | May 14, 1931 |